United States Patent [19]
Eglit

[11] Patent Number: 5,896,179
[45] Date of Patent: Apr. 20, 1999

[54] SYSTEM FOR DISPLAYING COMPUTER GENERATED IMAGES ON A TELEVISION SET

[75] Inventor: Alexander J. Eglit, San Carlos, Calif.

[73] Assignee: Cirrus Logic, Inc., Fremont, Calif.

[21] Appl. No.: 08/414,996

[22] Filed: Mar. 31, 1995

[51] Int. Cl.$^6$ ................................................. H04N 11/14
[52] U.S. Cl. ..................... 348/493; 348/488; 348/666; 348/552
[58] Field of Search .................... 348/552, 665, 348/666, 554, 728, 555, 706, 556, 488, 557, 493, 558, 663, 664; H04N 9/78, 11/14

[56] References Cited

U.S. PATENT DOCUMENTS

| | | | |
|---|---|---|---|
| 4,460,918 | 7/1984 | Flesza | 348/554 |
| 4,635,099 | 1/1987 | Nicholson et al. | 348/558 |
| 4,644,387 | 2/1987 | Bell et al. | 348/554 |
| 4,745,478 | 5/1988 | Nakagawa et al. | |
| 5,255,097 | 10/1993 | Spiero et al. | 348/558 |

FOREIGN PATENT DOCUMENTS

| | | | |
|---|---|---|---|
| 0442478 | 8/1991 | European Pat. Off. | H04N 9/78 |
| 0098515 | 3/1979 | Japan | 358/142 |
| 0157391 | 8/1985 | Japan | 358/31 |
| 0289790 | 12/1985 | Japan | H04N 9/78 |
| 0292794 | 11/1988 | Japan | H04N 9/78 |

*Primary Examiner*—David E. Harvey
*Attorney, Agent, or Firm*—Lowe, Price, LeBlanc, & Becker; David L. Stewart; Steven A. Shaw

[57] ABSTRACT

In a graphics card of a computer, a circuit is provided for displaying graphic presentations generated by the card on an external TV set. A TV adapter controls a horizontal state machine of a CRT controller so as to delay generation of CRT timing signals by a time period variable with horizontal lines. As a result, a composite video signal is provided with a time-base variable front porch to simulate VTR video signals. In response to the generated composite video signal, the TV set switches into a VTR mode to disable a comb filter used for separating luminance and chrominance components of a broadcast television signal.

15 Claims, 5 Drawing Sheets

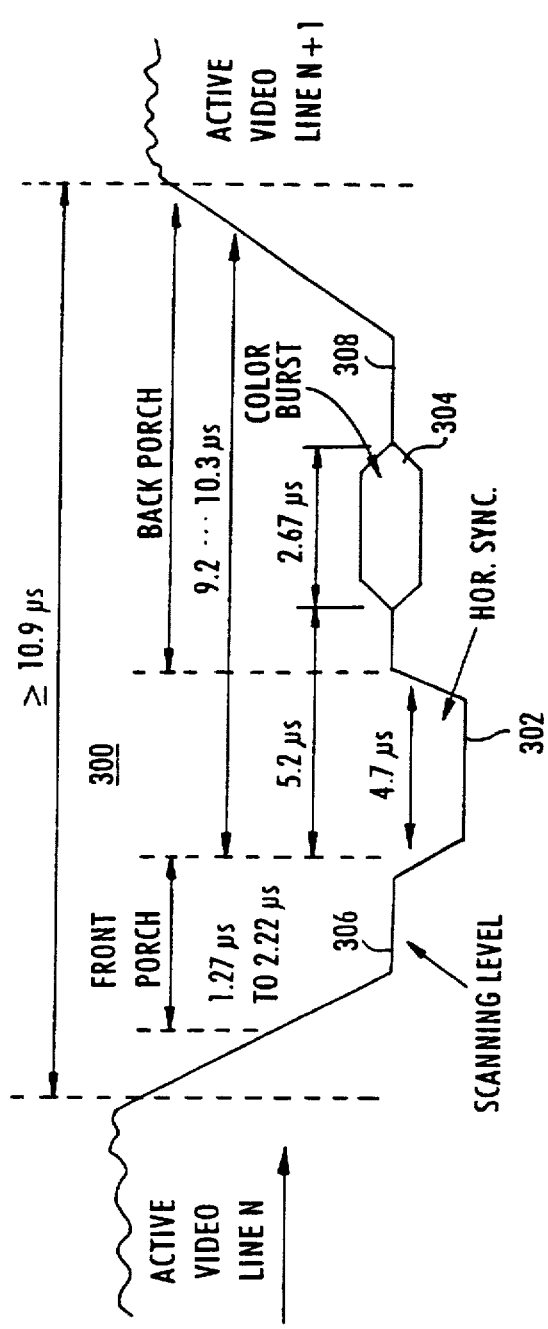
Fig. 6
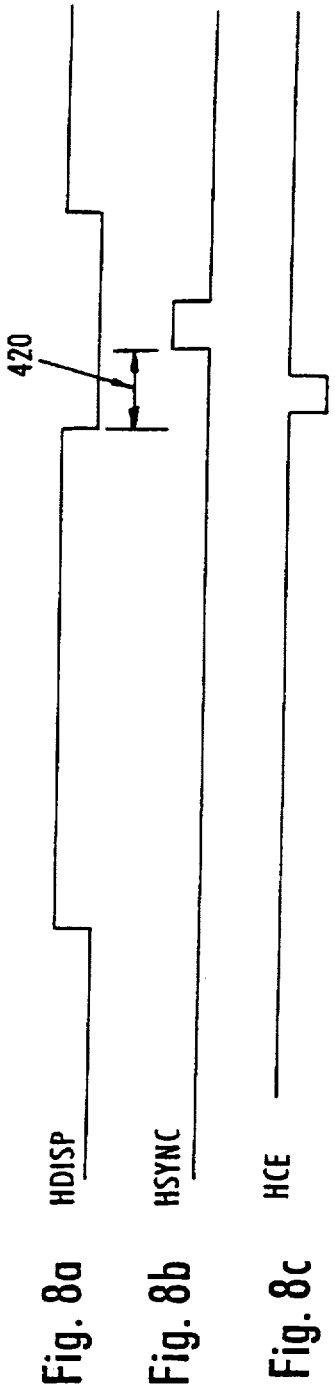
Fig. 8a HDISP
Fig. 8b HSYNC
Fig. 8c HCE

SYSTEM FOR DISPLAYING COMPUTER GENERATED IMAGES ON A TELEVISION SET

TECHNICAL FIELD

The present invention relates generally to computer graphics systems, and more particularly, to interfacing a computer to a television (TV) set to display computer generated images on the TV set.

BACKGROUND ART

In a TV system, luminance and chrominance components are mixed in a composite TV signal transmitted on a single channel. The components are separated in TV sets prior to the recovery of the primary color signals for the display. However, for broadcast TV systems, this process has imposed a substantial limitation on the horizontal resolution available in TV sets. Signal intermodulation arising in the bands occupied by the chrominance subcarrier signal have produced degradations in the image known as cross-color and cross-luminance. The first causes a display of false colors to be superimposed on repetitive patterns in the luminance image, while the second causes crawling dot patterns, primarily visible around colored edges. To improve the definition of TV sets, the signal mixture between luminance and chrominance is substantially reduced using comb filters.

Referring to FIG. 1, a typical comb filter 30 may comprise, for example, a delay circuit 32 that delays the input composite signal by one line-scan interval equal to 64 µs for the PAL and SECAM systems or equal to 63.555 µs for the NTSC system. In broadcast type video signals, the chrominance component is band-limited in the vertical direction. In this case, as shown in FIG. 2, the chrominance subcarrier signal shifted by 180° from line to line (according to the NTSC standard) has essentially the same amplitude on subsequent horizontal lines 1 and 2. Accordingly, an adder 34 that adds the delayed signal to the input provides a luminance output nearly devoid of chrominance content. Conversely, a subtractor 36 that subtracts the delayed signal from the input, produces a chrominance output similarly devoid of luminance. When the output luminance and chrominance signals are used to recover the cross-color signals, the cross-color and cross-luminance effects are largely removed.

Unlike the broadcast type video signals, computer generated images can have very sharp color transitions from line to line. As shown in FIG. 3, the chrominance content of the computer generated video signal on line 1 is completely different from the chrominance on line 2. Accordingly, if computer generated video signals are supplied to the comb filter 30, it would introduce chrominance leftovers from line 1 into the chrominance and luminance signals of the subsequent line 2. As a result, highly visible artifacts would appear to an observer as one or more dashed lines below sharp color transitions. For example, in the case of a thin horizontal line with a bright red saturated color on a black background, the artifacts will be represented by up to 5 dashed red lines under the original line. The intensity of the dashed lines decreases as their distance from the original line increases.

The growth in multi-media computer applications that require the images that are generated by portable computers having small screens to be displayed on large screens of external TV sets, for example, on a large viewing screen of a projection TV set, creates a need for interfacing a computer to a TV set. However, as discussed above, the comb filter in a TV set causes the artifacts to be superimposed over the displayed image on a TV screen. When displayed on a large screen TV, such as for a multi-media presentation, these artifacts will become particularly noticeable and objectionable.

To prevent the artifacts from being formed, it would be desirable to disable the comb filter in the luminance/chrominance separator of the TV set when the computer generated images are supplied to the TV set. In this case, the TV set separator will revert to the bandpass/bandstop filtering strategy that is currently used to separate luminance and chrominance of a video signal supplied from a video tape recorder (VTR). VTR video signals have specific time-base distortions recognizable by a TV set that switches to a VTR mode of operation in response to these distortions.

DISCLOSURE OF THE INVENTION

One advantage of the invention is in providing a system for interfacing a computer to a TV set to allow a high quality picture to be displayed on a TV screen.

Another advantage of the invention is in providing a system for displaying images generated by a computer with the Video Graphics Array (VGA) card on an external TV set.

A further advantage of the invention is in providing a system for interfacing a computer to a TV set to prevent artifacts from being superimposed over computer generated images on a TV screen.

The above and other advantages of the invention are achieved, at least in part, by providing a system for displaying computer generated images on a video monitor that has a filter for separating luminance and chrominance components of a broadcast television signal. A graphics card of the computer is equipped with a video controller that introduces a control component into composite video signal supplied to the video monitor. In response to the control component, the filter is disabled.

Preferably, the control component of the composite video signal is represented by a time-base variable "front porch". The front porch is provided in the composite video signal between an active video line and a horizontal sync pulse. The video signal having the time-base variable front porch simulates a VTR video signal.

In accordance with a preferred embodiment of the invention, the video controller comprises a state machine controlled by clock pulses to generate timing signals defining the composite video signal. The state machine produces an output signal that disables the state machine from responding to the clock signals. A delay circuit responsive to the output signal generates an enabling signal delayed in accordance with a horizontal line count. A feedback circuit supplies the enabling signal to the state machine to resume its operation. As a result, the time-base variable front porch is provided on the composite video signal.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 6 a diagram illustrating a composite video signal, in accordance with the present invention.

FIGS. 8a–8c diagrams illustrating signals shown in FIG. 5.

BEST MODE FOR CARRYING OUT THE INVENTION

Figure 1:
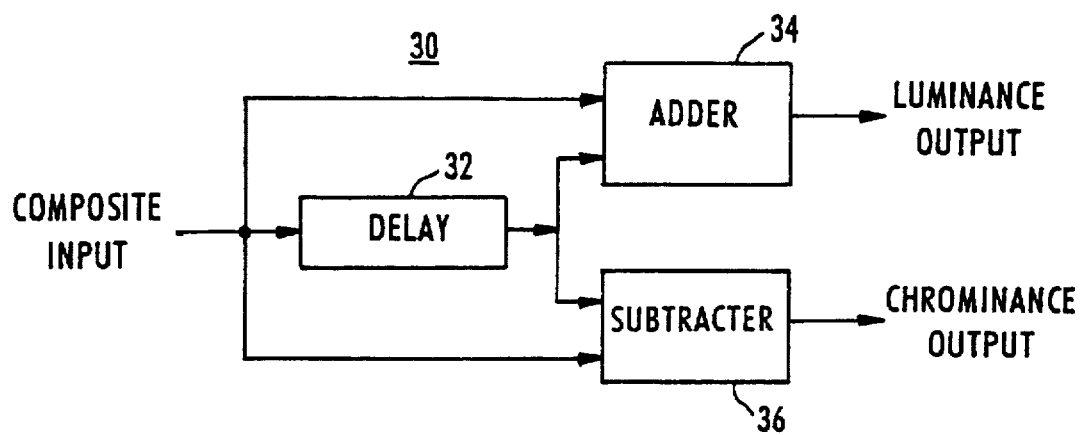
FIG. 1 a diagram of a comb filter for separating luminance and chrominance components of a broadcast television signal.
Figure 2:
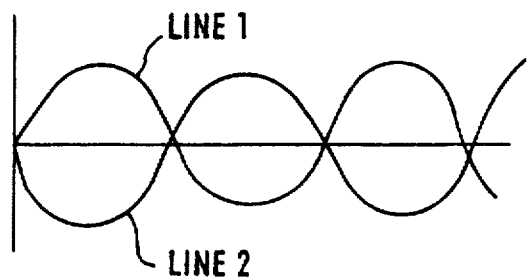
FIGS. 2 and 3 diagrams illustrating operation of the comb filter.
Figure 3:
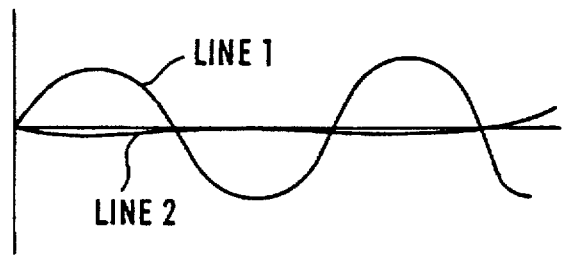
Figure 4:
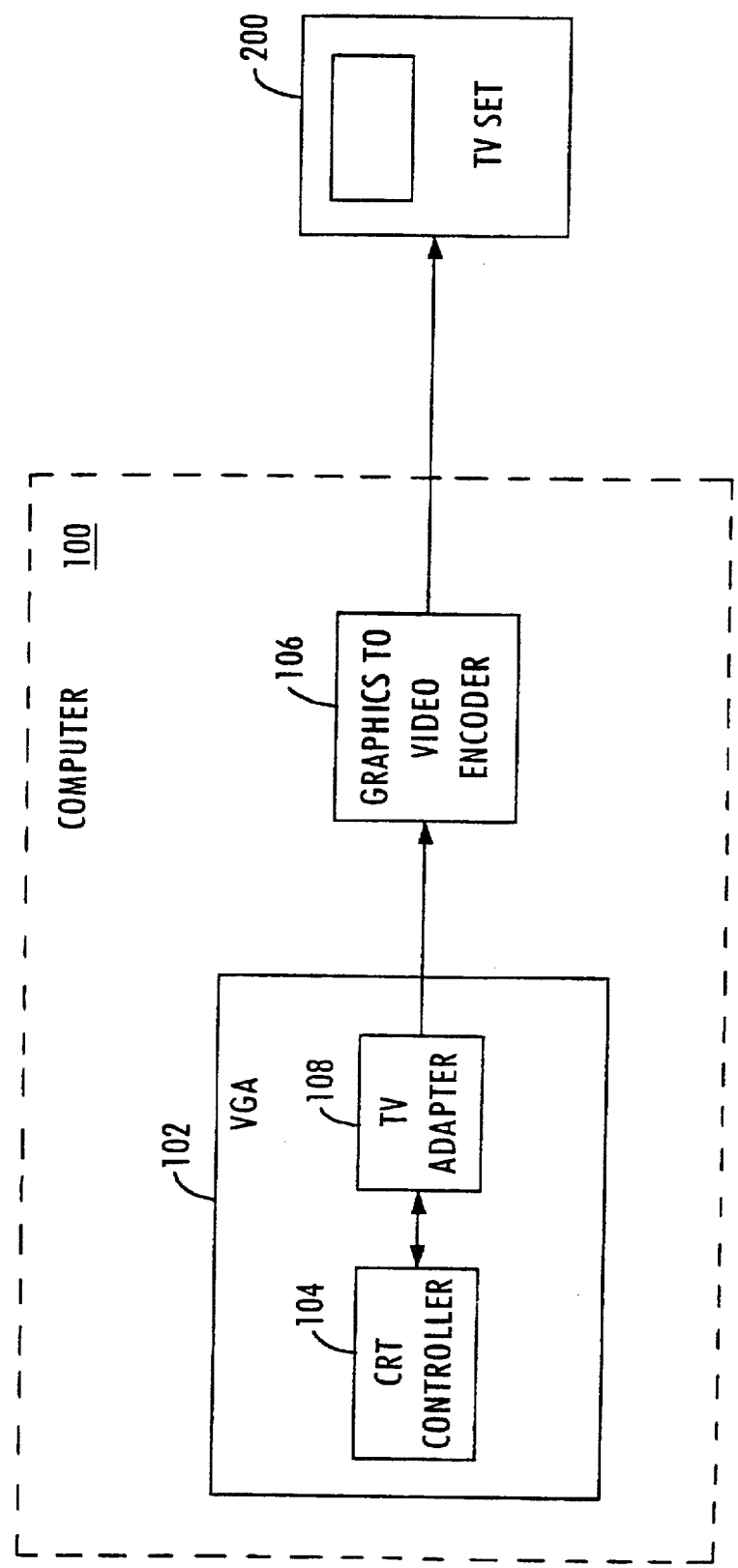
FIG. 4 a simplified block diagram of a system for displaying computer generated images on a TV set, in accordance with the present invention.

Although the invention has general applicability in the field of displaying computer generated images on a video monitor, the best mode for practicing the invention is based in part on the realization that the images are generated based on the Video Graphic Array (VGA) computer graphics standard developed by IBM corporation. Referring to FIG. 4, a computer 100 is equipped with a VGA card 102 incorporating the VGA standard to provide graphic presentation of data. The VGA card 102 is implemented in Very Large Scale Integrated (VLSI) circuitry and comprises a cathode-ray tube (CRT) controller 104 that generates timing signals to control raster-scan CRT displays. An encoder 106 is coupled to the VGA card 102 to convert graphic presentations formed by the ViA card 102 into a composite video signal supplied to an external video monitor, for example, a TV set 200. The external TV set is particularly suited for use with computers having a small screen, for example, for notebook computers. The TV set 200 may have a large screen, for example, such as a viewing screen of a projection TV set. However, it is to be understood that other types of computers and video monitors can be utilized in accordance with the broad aspects of the present invention.

The TV set 200 incorporates a comb filter for separating luminance and chrominance components of a broadcast television signal. As discussed above, when a video signal representing computer generated images is supplied to the TV set 200, the comb filter causes artifacts to be formed on the TV screen. To prevent the artifacts from being displayed, the CRT controller 104 is coupled to a TV adapter 108 that controls the CRT controller 104 so as to supply the TV set 200 with a video signal that switches the TV set 200 into a mode in which its comb filter is disabled. Conventionally, such a mode is established when a TV set is supplied with video signals from a VTR. In this mode, the bandpass/bandstop filtering strategy is used. Preferably, the TV adapter 108 is incorporated into the VGA card 102, although it may be external to the VGA card in other embodiments. The TV adapter 108 and its interaction with the CRT controller 104 will be discussed in more detail below.

Figure 5:
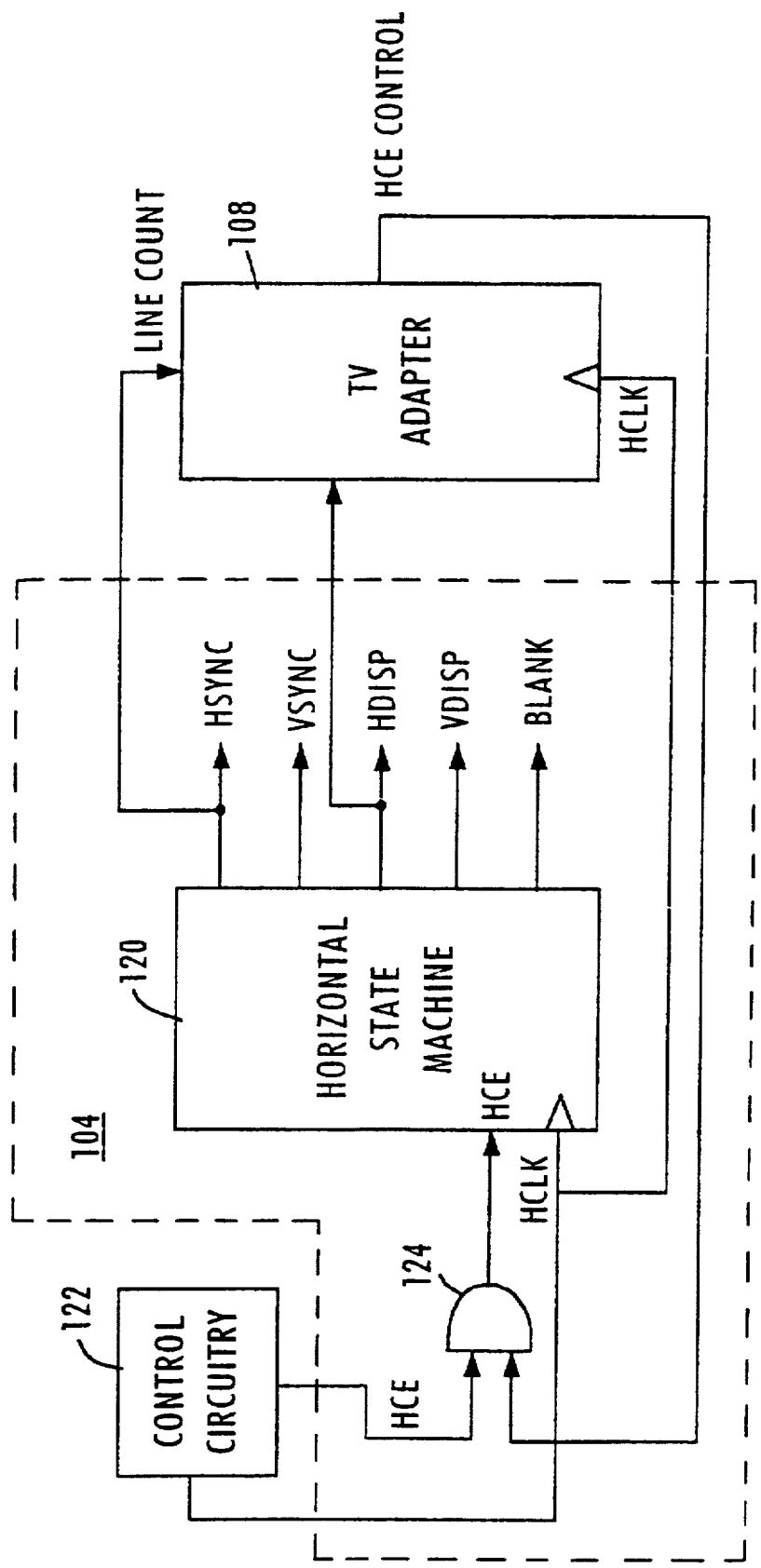
FIG. 5 block diagram illustrating interaction between the horizontal state machine and TV adapter shown in FIG. 4.

Referring to FIG. 5, the CRT controller 104 comprises a horizontal state machine 120 that generates the following CRT timing signals: horizontal sync signal HSYNC, vertical sync signal VSYNC, horizontal display enable signal HDISP, vertical display enable signal HDISP and blanking signal BLANK. The HSYNC is the master timing pulse in the horizontal timing cycle and signals the TV set 200 to begin the retrace period. The HDISP defines when the video data input is being output to the TV set display. The display signals are synchronized so that tile start of the horizontal timing period coincides with the start of the display enable period. The VSYNC defines the vertical timing cycle and signals the TV set 200 to begin a new screen, sending the electron beam back to the top left corner of the TV set display. The VDISP signifies when the horizontal lines of video data input are being output to the TV set display. The display signals are synchronized so that the start of the vertical timing period coincides with the start of the display enable period. The horizontal and vertical blanking signals (BLANK) are provided to render the return trace invisible on the TV set display.

The horizontal state machine 120 changes its state under control of horizontal clock signals HCLK supplied from control circuitry 122 of the VGA card. Also, the control circuitry 122 provides the horizontal state machine 120 with a horizontal clock enable (HCE) signal that enables the state machine 120 to change its state in response to the HCLK signals. When the RCE signal goes low, the horizontal state machine 120 pauses. The HCE signal is supplied through an AND gate 124 having its output coupled to an HCE input of the horizontal state machine 120.

The CRT timing signals provided by the horizontal state machine 120, together with Red, Green and Blue video signals, are supplied to the encoder 106 to generate a composite video signal supplied to the TV set 200.

FIG. 6 shows a horizontal blanking interval 300 provided in the composite video signal between adjacent active video lines N and N+1. The horizontal blanking interval 300 incorporates a horizontal sync pulse 302 and a color-synchronizing burst 304. The duration of the horizontal blanking interval may be equal to or more than 10.9 µs. The durations of the horizontal sync pulse 302 and the color-synchronizing burst 304 may be equal to 4.7 µs and 2.67 µs, respectively. A front porch 306 is provided between the horizontal sync pulse 302 and the preceding active line N. A back porch 308 is incorporated between the horizontal sync pulse 302 and the following active line N+1. The blanking level separates video information from synchronizing information.

The TV adapter 108 enables the horizontal state machine 120 to generate the timing signals that cause the duration of the front porch 306 to vary with active lines. This variation can be, for example, from 1.27 µs to 2.22 µs. The back porch duration is maintained fixed in the range, for example, from 4.5 µs to 5.6 µs. Due to the varying front porch, the composite video signal simulates VTR video signals that cause the comb filter in the TV set 200 to be disabled.

To provide the time-base variable front porch of the composite video signal, the HDISP signal generated by the horizontal state machine 120 is supplied to the TV adapter 108 that generates the HCE control signal. Via a feedback control loop, the HCE control signal is supplied to one input of the AND gate 124. As discussed above, another input of the AND gate 124 is fed with the HCE signal from the control circuitry 12.2. As a result, the HCE signal goes low to prevent the horizontal state machine 120 from responding to the HCLK signals when the HCE control signal goes low, thereby essentially pausing the state machine 120. The HCLK signals from the control circuitry 122 are also used to clock the TV adapter 108. The HSYNC signal from the horizontal state machine 120 is supplied to the TV adapter 108 to provide a horizontal line count.

Figure 7:
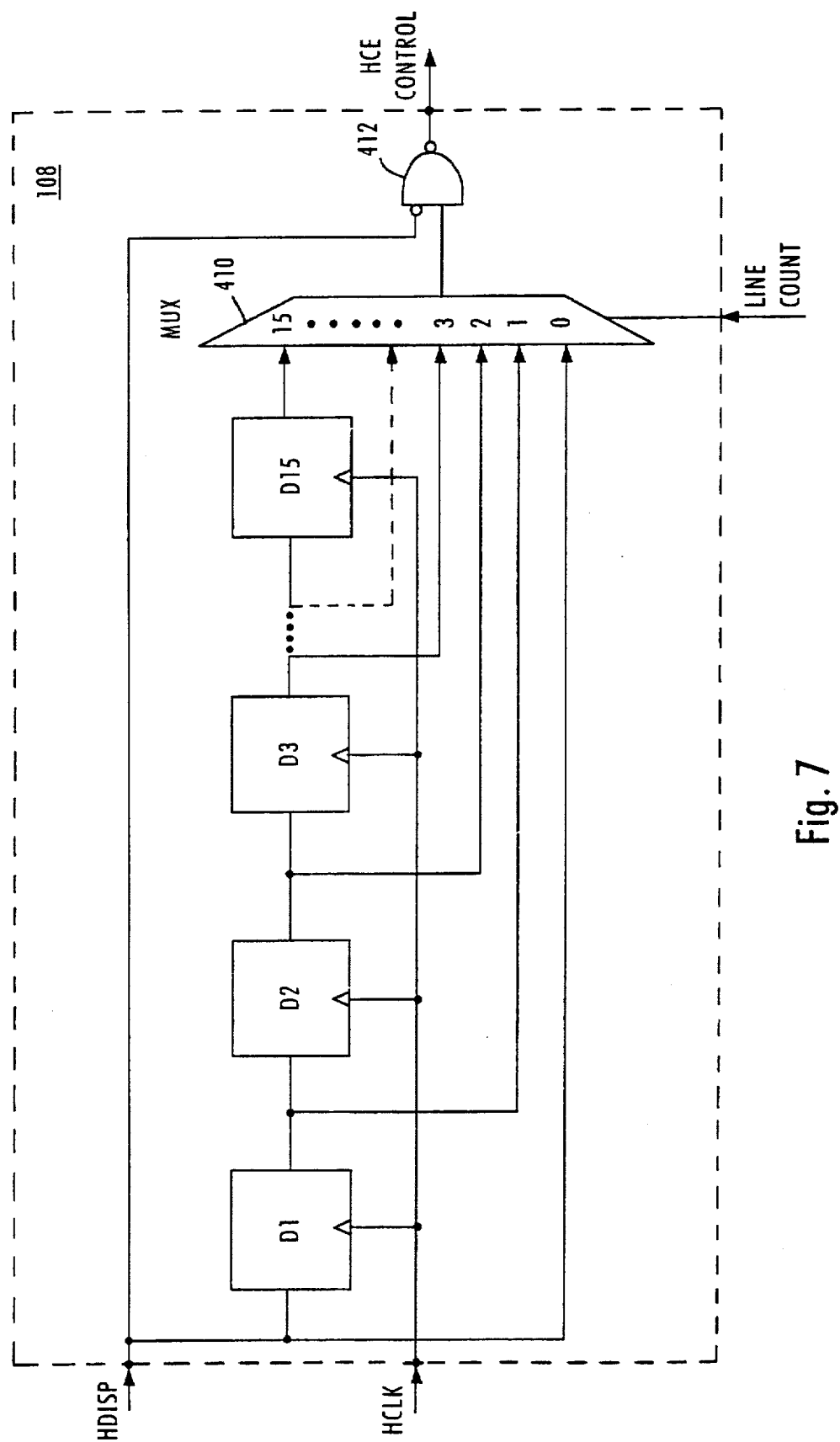
FIG. 7 a diagram of the TV adapter shown in FIGS. 4 and 5.

Referring to FIG. 7, an exemplary embodiment of the TV adapter 108 comprises fifteen D flip-flop circuits D1–D15 coupled in series. Each of the circuits D1–D15 is clocked by the HCLK signals from the control circuitry 122. The HDISP signal supplied to the input of the first D flip-flop circuit D1 by the state machine 120 is sequentially shifted through all of the circuits D1–D15 by the HCLK signals. The HDISP input and outputs of each of the circuits D1–D15 are respectively coupled to inputs 0–15 of a multiplexer 410 that selectively couples one of its inputs to its output. The multiplexer input selection is controlled by the horizontal line count obtained, for example, by counting the HSYNC signals provided at the end of each horizontal line. The counting may be performed, for example, by a counter coupled to the HSYNC line of the horizontal state machine 120. As a result, input 0 of the multiplexer 410 is coupled to its output when horizontal line 0 is to be displayed, input 1 is selected for line 1, input 2—for line 2, etc. At each of the inputs 0–15, the signal HDISP is delayed by a is different delay period. The delay period is equal to 0 for the input 0 and successively increases by a delay time of the flip-flop circuits D1–D15 for the inputs 1–15.

The output of the multiplexer 410 is supplied to one input of a NAND gate 412 that generates the HCE control signal at its output. Another input of the gate 412 is supplied with the HDISP signal through an inverter. As shown in FIGS. 8a–8c, when the HDISP signal (FIG. 8a) goes low, the UCE control signal at the output of the gate 412 also goes low. As discussed above, the low level of the HCE control signal causes the HCE signal (FIG. 8c) to go low, to prevent the horizontal state machine 120 from changing its state in response to the HCLK signals. As a result, the generation of the CRT timing signals by the state machine 120 is suspended. In particular, the HSYNC signal (FIG. 8b) to be generated by the horizontal state machine 120 is delayed. The HCE control signal at the output of the gate 412 goes high when the delayed HDISP signal is supplied from the output of the multiplexer 410. In response, the HCE signal (FIG. 8c) at the output of the gate 124 goes high to enable the horizontal state machine 120 to resume the CRT timing signals generation.

Hence, the generated HSYNC signal is delayed with respect to the falling edge of the HDISP by a variable time period that depends on the delay period of the HDISP signal in the TV adapter 108. As the HDISP delay period is defined by the horizontal lines, the interval 420 between the HDISP falling edge and the HSYNC pulse also varies with the horizontal lines.

As discussed above in connection with FIG. 6, the front porch 306 in the composite video signal supplied to the TV set 200 is provided between the preceding active line N and the horizontal sync pulse 302. As the active line is defined by the HDISP signal, and the horizontal sync pulse is defined by the HSYNC signal, the duration of the front porch 306 in the generated composite video signal varies with the horizontal lines. The composite video signal having a variable front porch therefore simulates a VTR video signal and causes the TV set 200 to be switched into a VTR mode of operation, where the comb filter for separating luminance and chrominance components of a broadcast TV signal is disabled.

In summary, the results and advantages of the system for displaying computer generated images on a TV set 200 can now be more fully appreciated. The TV adapter 108 is provided on the VGA card 102 of the computer 100. The TV adapter 108 controls the horizontal state machine 120 of the CRT controller 104 so as to provide a pause in generation of CRT timing signals that varies with horizontal lines. As a result, a composite video signal having a variable front porch is generated to simulate a VTR video signal. In response to the generated composite video signal, the TV set 200 switches into a VTR mode of operation to disable its comb filter that causes artifacts to be superimposed over the computer generated images on the screen. As a result, a high-quality picture of the computer generated images is obtained on the TV set 200.

It will also be recognized that the system of the present invention allows the standard VGA computer graphics card to be adapted for displaying graphic data on an external TV set.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A system for displaying computer generated images comprising:
   a video monitor having a comb filter for separating luminance and chrominance components of a broadcast television signal, and
   a computer having a graphics circuit for generating graphic images for display on said video monitor,
   said graphics circuit comprising a video controller for generating a control signal supplied to said video monitor to disable said filter when said graphic images are supplied to said video monitor whereby luminance and chrominance components are decoded without comb filtering.

2. The system of claim 1, wherein said graphic images are supplied to said video monitor as a video signal and wherein said video controller generates said control signal by modifying said video signal.

3. The system of claim 2, wherein said control signal is generated by varying the duration of a portion of horizontal line signals.

4. The system of claim 3, wherein the duration of horizontal line signals is varied by disabling a clock signal supplied to said video controller to generate a porch on a horizontal line signal.

5. The system of claim 3, wherein said porch is located in said video signal between an active video line and a horizontal sync pulse.

6. The system of claim 2, wherein said video controller generates said video signal to simulate an output video signal of a VTR.

7. The system of claim 1, wherein said video controller comprises a state machine controlled by clock pulses.

8. The system of claim 7, wherein said video controller further comprises a delay circuit responsive to an output signal of said state machine to form an enabling signal delayed in accordance with a horizontal line count.

9. The system of claim 8, wherein said video controller further comprises a feedback circuit that supplies said enabling signal to said state machine to enable said state machine to respond to said clock pulses.

10. The system of claim 2, wherein said graphics circuit comprises a graphics card compliant with the Video Graphics Array (VGA) graphics standards.

11. The system of claim 2, wherein said video monitor comprises a TV set external with respect to said computer.

12. A method of displaying computer generated images on a TV set having broadcast reception circuitry, comprising the steps of:
   generating a video signal supplied by a computer to the TV set to provide graphic presentation of the computer generated images on the TV set,
   affirmatively controlling the computer to generate a control component in the video signal to disable the broadcast reception circuitry in the TV set with the control component to thereby produce the computer generated images on the TV set without artifacts.

13. A method of displaying computer generated images on a TV set having broadcast reception circuitry, comprising the steps of:
   generating a video signal supplied by a computer to the TV set to provide graphic presentation of the computer generated images on the TV set,
   controlling the computer to generate a control component in the video signal, and
   disabling the broadcast reception circuitry in the TV set with the control component to thereby produce the computer generated images on the TV set without artifacts,
   wherein said step of controlling simulates generation of a VTR signal by varying the length of a front porch in the video signal.

14. Apparatus for generating a video signal, comprising:
   a computer configured to generate a video signal for application to a television set to provide a graphic presentation on said television set and for affirmatively introducing a control component in said video signal for disabling broadcast reception circuitry in said television set.

15. Apparatus of claim 14 in which the computer introduces a control component by varying the length of a front porch of a video signal.

* * * * *